United States Patent [19]
Van der Lans

[11] 4,079,755
[45] Mar. 21, 1978

[54] INFLATABLE PIPE PLUG

[76] Inventor: Gerald J. Van der Lans, 1310 West Turner Rd., Lodi, Calif. 95240

[21] Appl. No.: 683,064

[22] Filed: May 4, 1976

[51] Int. Cl.² .............................................. F16L 55/12
[52] U.S. Cl. ................................ 138/93; 156/123 R; 156/184; 156/187; 156/215; 156/218
[58] Field of Search ................... 138/89, 93; 156/121, 156/123, 133, 145–147, 152, 182, 184, 185, 187, 188–191, 196, 212, 213, 214, 215, 218, 221, 224, 69

[56] References Cited
U.S. PATENT DOCUMENTS

| | | | |
|---|---|---|---|
| 1,760,750 | 5/1930 | Goodman | 138/93 |
| 1,795,848 | 3/1931 | Dress | 138/93 |
| 1,853,515 | 4/1932 | Egerer | 156/145 |
| 2,678,666 | 5/1954 | Theis et al. | 138/93 |
| 2,927,609 | 3/1960 | Van der Lans | 138/93 |
| 3,030,253 | 4/1962 | St. John et al. | 156/196 |
| 3,129,726 | 4/1964 | Moore | 138/93 |

FOREIGN PATENT DOCUMENTS 188,695   11/1922   United Kingdom ................... 138/93

Primary Examiner—William A. Powell
Assistant Examiner—John E. Kittle
Attorney, Agent, or Firm—Owen, Wickersham & Erickson

[57] ABSTRACT

An inflatable pipe plug in which a series of reinforcing strips of rubber tire cord having unidirectional threads are sandwiched between inner and outer molded members of rubber. The strips include pairs crossing each other with their threads at angles to each other. One underneath sleeve-like strip is longer than the two molded rubber members and is folded back over other strips. A metal head has a tubular portion fitting into the interior of the inner rubber member and is vulcanized to it and also to an inner sleeve of rubber which is somewhat longer than the aluminum head and extends beyond it and is bonded also to the inner rubber member. The structure enables the plug to withstand stress when compressed air is supplied to it through a cap that is bolted to the aluminum head.

11 Claims, 9 Drawing Figures

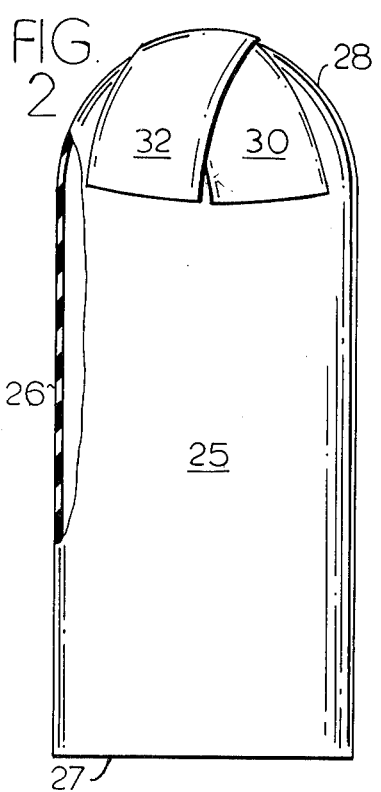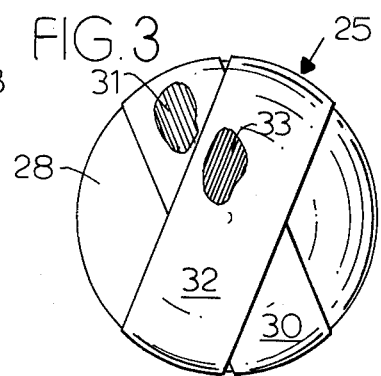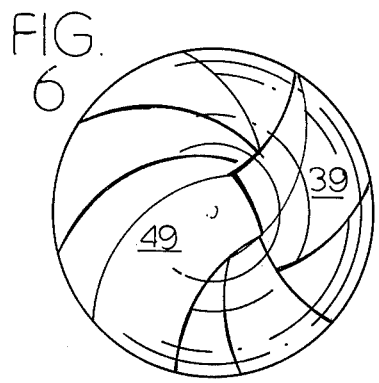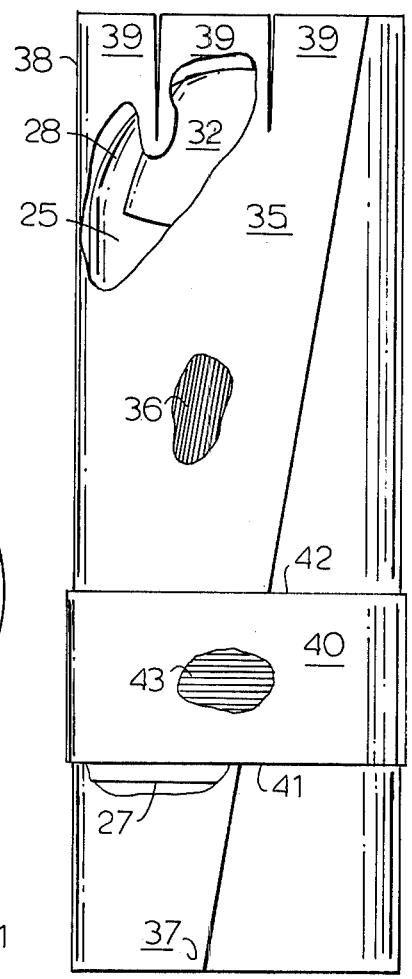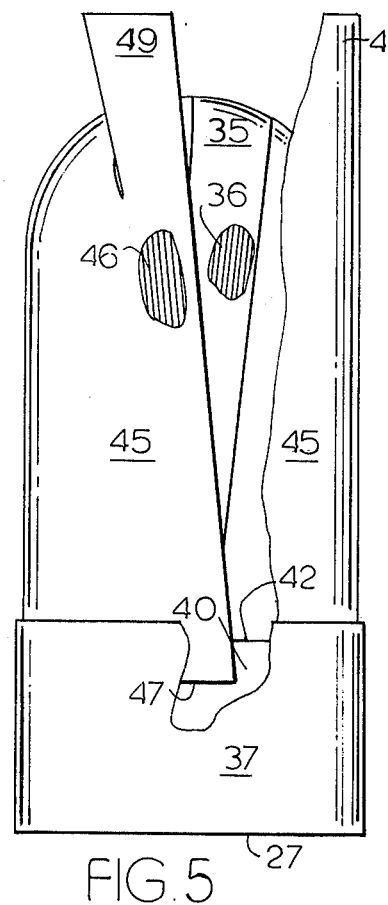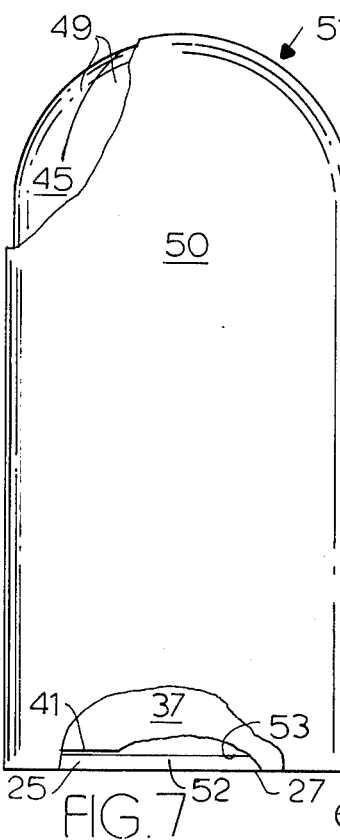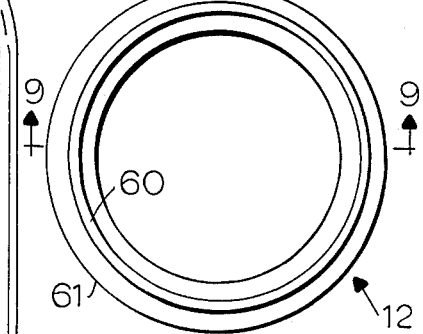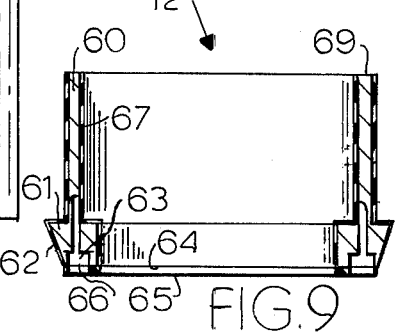

INFLATABLE PIPE PLUG

BACKGROUND OF THE INVENTION

This invention relates to an inflatable pipe plug.

There are numerous occasions when various pipes, such as water pipes and sewer pipes, should be temporarily plugged. Often this can be conveniently done by using an inflatable rubber plug which can be pulled through the pipe by means of a cable secured to the plug, and then, when the plug is at a desired location, air can be sent into the plug through a conduit lying generally parallel to the cable of attached to it. When air pressure is applied, the plug is expanded into very firm contact with the walls of the pipe. As a result, liquid in the pipe is kept from flowing past the plug. Later, the plug can be deflated and withdrawn.

Considerable pneumatic pressures may need to be applied, particularly where the hydraulic pressure is relatively high in the pipe, and the air pressure must be sufficient to retain the plug against this hydraulic pressure. Furthermore, the plug itself has to be able to expand without becoming weakened by frequent expansion and relaxation. Separation between the rubber portion and a metal end portion is to be avoided, and the rubber needs reinforcement.

In the past, some of these inflatable plugs have tended to give way under pressure. Others have tended not to be able to close off the pipe properly so as to prevent passage of liquid, because of the plug's inability to retain sufficient pressure or inability to expand, or for other such reasons. There have been points of weakness, where various layers or laminations of the plug have tended to come apart.

The present invention is intended to solve these various problems.

SUMMARY OF THE INVENTION

The present invention relates both to the plug and to the method for making it. The plug itself comprises a pair of rubber molded parts, generally of the uninflated shape of the plug, with a series of reinforcing strips sandwiched in between them.

Thus, to consider one type of such a plug, a molded one-piece rubber member may be initially provided in the shape of a cylinder open at one end and closed by a dome at the other end. The rubber member is placed in a mandrel, and its dome portion is snugly covered with a first strip of sticky rubber tire cord and that, in turn, is covered by a second strip of the same material. Both these strips have unidirectional threads and are set so that the threads cross, preferably at about 45°. This enables expansion while providing the needed reinforcement.

Next, the cylindrical portion of the rubber member is covered with a sleeve of sticky rubber tire cord, with its unidirectional threads set at about 10° to the longitudinal line of the cylinder; one end of the sleeve extends well beyond the open end of the cylinder, while another end extends beyond the juncture of the cylinder and dome. This latter portion is preferably split into several strip-like portions, which are then used to cover both the dome and the first and second strips that were applied thereto earlier, the strip-like portions being worked to overlap each other.

A circumferential band of sticky rubber tire cord is then applied, near the open end, over the sleeve, with its unidirectional threads running circumferentially. Next, another sleeve of rubber tire cord is applied, also with its threads lying at about 10° to longitudinal but in the opposite direction from those of the preceding sleeve, overlying it snugly and also overlying at least part of the band. The dome-like portion is again covered with split strip-like portions, as with the preceding sleeve.

The end of the preceding sleeve which extends beyond the open end of the cylinder is then folded back and is used to cover the entire width of the band and somewhat of the other sleeve. All of these strips and sleeves are then covered over snugly with an outer layer of rubber and at least partly vulcanized in a mold.

A metal head member, preferably aluminum, having an axially-extending tubular portion and a radially-outwardly extending end flange, is attached to the rubber assembly. The tubular portion is inserted inside the rubber assembly, and the flange is brought up against the end thereof. Before insertion, the metal member is lightly coated with rubber cement, and upon its insertion a rubber sleeve is placed inside it and brought into firm contact for the full length of the tubular portion and somewhat therebeyond to the inner rubber layer. This assembly is then vulcanized to completion of the vulcanization reaction.

The plug is completed by bolting to the end flange, preferably with a gasket in between, a cap which closes the open end except for an air inlet and is also provided with an exterior anchor for attachment to the cable, which is used to pull the plug through the pipe. In use, an air line is attached to the inlet so that air under pressure can be sent therethrough to expand the assembly.

The reinforcement, as described, solves problems at several critical points. It overcomes the tendency of the aluminum member to separate from the rubber assembly and the tendency of water to get in between the two rubber members along the threads of the reinforcing members. It also helps to prevent damage from pnuematic pressure. It strengthens the dome portion, when there is one, and also helps to prevent overexposure there.

Other objects and advantages of the invention will appear from the following description.

BRIEF DESCRIPTION OF THE DRAWINGS

In the drawings:

FIG. 2 is a view in elevation and partly in section of the plug in an early stage of manufacture, where a molded domed inner member is covered at the dome only with a pair of crossed reinforcing strips.

FIG. 3 is an end view of the plug of FIG. 2 (looking down on FIG. 2), with portions of the reinforcing strips partly broken away to show the unidirectional threads of each.

FIG. 4 is a view in elevation of the plug as it is when to the structure of FIG. 2 is added a generally lengthwise-extending sleeve, i.e., a strip formed into a cylindrical shape, and a circumferential band to that. Portions of the sleeve are band are broken away to show underlying parts and also to show their unidirectional threads.

FIG. 5 is a view in elevation, with parts broken away of a later stage of manufacture, incorporating another lengthwise sleeve and with the overlength end portion of the sleeve introduced in FIG. 4 folded back over the band. Portions are broken away to show the unidirectional threads, and some strip-like portions of the latest sleeve have not been closed over the dome.

FIG. 6 is an end view of the structure of FIG. 5, looking down on the top of that view, after the dome has been fully covered by the strips.

FIG. 7 is a view in elevation of the next stage of the device, where an outer rubber member has been molded and vulcanized to the structure of FIG. 6; a portion of the dome is broken away to show the underlying reinforcing structure.

FIG. 8 is an end view of a metal head for use with the rubber assembly of FIG. 7.

FIG. 9 is a view in section of the head, taken along the line 9—9 in FIG. 8.

DESCRIPTION OF A PREFERRED EMBODIMENT

Figure 1:
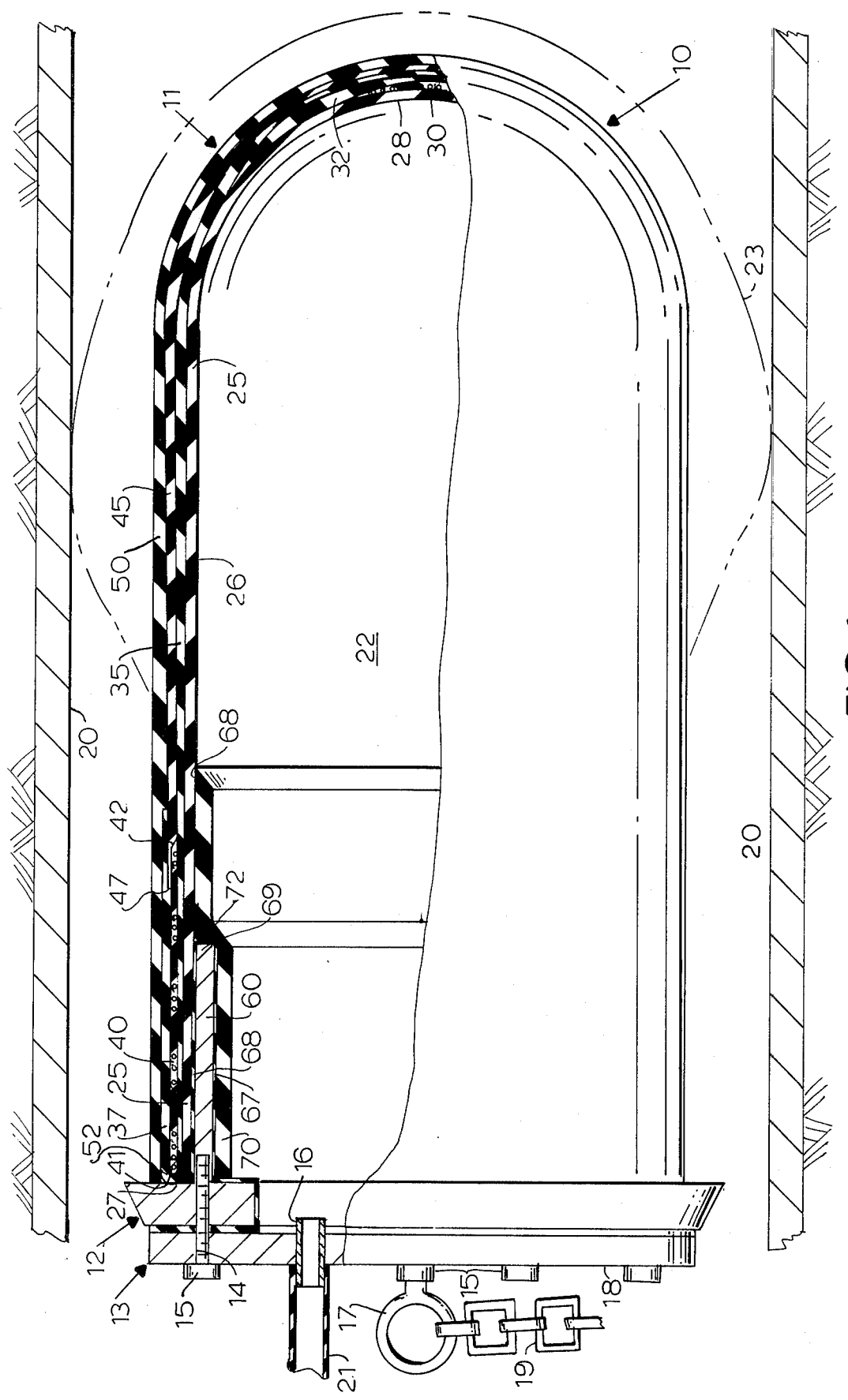
FIG. 1 is a view in section of a pipe and an inflatable plug therein embodying the principles of the invention. The plug is shown partly in elevation and partly in section, and broken lines indicate an inflated position of part of its walls.

The rubber portions of the plug of the present invention are preferably made from a suitable formulation of natural rubber with the usual supplementary chemicals including carbon black, vulcanization chemicals, and so on, in reinforcing threads as used in tire cords, such as nylon.

FIG. 1 shows a plug 10 embodying the principles of the invention. Basically, it comprises a reinforced rubber assembly 11, an annular metal head 12 cemented thereto, and a metal cap 13 bolted to the head 12. The cap 13 is a disc which is solid except for bolt openings 14 to receive a ring of securing bolts 15 and for an air inlet fitting 16. The cap 13 has an anchor ring 17 secured at its center on its outer face 18, so that a cable or chain 19 may be secured to it, for pulling it through a pipe 20. A suitable air conduit 21 is attached to the fitting 16 when the plug 10 is put in use, and when the plug 10 has been pulled by the chain 19 to a suitable location, air is sent under pressure by the conduit 21 into the hollow interior 22 of the plug 10 to expand it so that the rubber portion, upon inflation, can assume the shape shown by the broken line 23, to seal against the pipe 20 and plug it.

The plug 10 exemplifies the invention, which can be applied to other structures as well, including that shown in co-pending application Ser. No. 664,049, filed Mar. 4, 1976.

The structure of the plug 10 and the method of its manufacture can be explained simultaneously with reference to FIGS. 2-9. First, an inner unitary unreinforced rubber member 25 (See FIG. 2) is molded in the form of a cylinder 26 with an open end 27 and a closed dome-like end 28. The member 25 may then be placed on a mandrel (not shown) for the steps involved in FIGS. 3-7, or it may be left on a mandrel (not shown) around which it has been molded. At this step the member 25 is not fully cured.

The next several steps employ sticky rubber tire cord with unidirectional threads. The threads are preferably made from nylon, and the rubber itself is preferably based on natural rubber, since it should be capable of a great deal of elongation.

A strip 30 of rubber tire cord is used to cover at least the center of the dome 28 and preferably more. The sticky strip 30 of the cord containing unidirectional threads 31, is placed on top of the rubber dome 28 and is firmly secured to it, as by pressing it firmly thereagainst. Over it another strip 32 of the rubber tire cord is used, its threads 33 preferably running at an angle of about 45° with respect to the threads 31 of the preceding strip 30. The crossing threads 31 and 33 increase the strength, while still enabling more elongation that would be possible if one used threads crossing at 90°. An angle of about 45° seems to give the best results in strengthening while still permitting elongation.

Next, a much larger strip (or a plurality of strips) of rubber tire cord is applied to the cylindrical portion 26 to provide a reinforcing sleeve 35 with its threads 36 running generally longitudinally but preferably at an angle of about 10° to a line parallel to the longitudinal axis. This sleeve 35 is made oversize so that a first terminal portion 37 extends well beyond the open end 27 of the tube 25, preferably by a distance of three or four inches. At the other end a second terminal portion 38 is made long enough for application to the dome 28 with a little overlap. The portion 38 is cut into a plurality of strip-like portions 39 that can overlap each other and fit over the dome 28 more easily than if one attempted to try to close an unsplit cylindrical portion over the dome.

The next step is to wind a band 40 of rubber tire cord around the sleeve 35, with one edge 41 of the band 40 adjacent to the open end 27 or with a short setback therefrom and the other edge 42 distant therefrom but still far short of the dome 28. The band 40 has its threads 43 running circumferentially, and the band 40 may be one 360° turn or more. This band gives special reinforcement for this lower portion of the cylinder 26.

A second sleeve 45 of rubber tire cord is then placed over the first sleeve 35. The sleeve 45 extends longitudinally with its threads 46 extending at about 10° with respect to the longitudinal, but this time inclined oppositely to that of the first sleeve 35, so that the two sleeves 35 and 45 together have their threads 36 and 46 lying at an angle about 20°, relative to each other. One edge 47 of the sleeve 45 laps over the edge 42 of the band 40, while the other end portion 48 extends substantially as the preceding sleeve does, beyond the dome 28 and is then split into strips 49 and secured to the dome 28.

Then the overlength portion 37 of the sleeve 35, which extends beyond the open end 27 is folded back over the band 40 (preferably spread away from the end 27) and over a portion of the upper sleeve 45 and firmly set in place so that it extends somewhat beyond the edge 42 of the band 40 and against the sleeve 45. This prevents weakness at the juncture 42 of the band 40, and also, by the folding over, protects the assembly from water working in between threads and following along the threads, since as will soon be seen, this sleeve portion 37 will soon be vulcanized inside an outer layer of rubber and there will be no place where such water can enter.

With the strips, sleeves, and bands of rubber tire cord all in place, and it should be stressed that they are always worked very snugly into engagement with the element directly beneath them, their stickiness enabling them to hold this position, once taken, then another rubber member 50, preferably about ⅛ inch thick, as is the inner member 25, is molded over the underlying parts, and the assembly 51 as thus far composed is vulcanized together, the vulcanization preferably not being quite fully completed since there will be another vulcanization step later. At this stage then, there are two rubber members 25 and 50 with the reinforcing members 30, 32, 35, 40, and 45 sandwiched in between them and with the threads 31, 33, 36, 43, and 46 at inclinations enabling superior reinforcement while not preventing elongation when it is desired. Elongation is substantially prevented in the area of the band 40, where the threads 46, 43, and 36 cross each other at such angles that there is practically no ability of the plug 10 to expand in that area. This is desirable, since it is desirable to hold this part against expansion and to provide the expansion therebeyond.

Moreover, an area 52 between the end 27 and a line 53 where the portion 37 is folded over the band edge 41, is provided where the rubber member 50 is directly vulcanized to the member 25, thereby locking out access of water to the threads or to the tire cord at all.

The metal head 12 may be made from aluminum, though other metals can be used. The head is preferably made in the annular form shown in FIGS. 8 and 9 having a tubular portion 60 with a radially outwardly-extending flange 61 at one end. Preferably the flange 61 has an edge 62 sloped inwardly on a line similar to a bevel, and the flange 61 is somewhat thicker than the plug assembly 51 or is approximately the same thickness. The flange 61 is provided with a series of radially-extending bolt openings 63 extending in from the exposed face 64 thereof, and a gasket 65 is fitted over this exposed face 64, having openings 66 aligned with the openings 63, enabling the passage of the bolts 15 into the bolt openings 63. The gasket 65 is also rubber, and the entire metal head 60 is preferably lightly coated with rubber cement 67.

The head 12 is slipped into the rubber plug assembly 51, the sizing being such that the sleeve 60 fits very snugly against the interior cylindrical surface 68 of the inner rubber member 25. A weakness might develop from the flexing of the rubber at the edge 69 of the tubular portion 60. This is counteracted in two ways: (1) the band 40 is somewhat wider than the length of the tubular portion 60, so that the tubular portion 60 stops short of the edge 42 of the band 40, so that flexing at the edge 69 is restricted; (2) an inner sleeve 70 of rubber is inserted into the inner surface 71 of the head 12, preferably being inserted simultaneously with it, after being stuck tightly to its coating 67. The sleeve 70 extends well beyond the edge 69, preferably for about another inch or two beyond, to a beveled edge 72, being worked firmly into engagement with the inner surface 68 of the inner rubber layer 25. Then the entire assembly is vulcanized so that the plug 12, the sleeve 70, the gasket 65, preferably, and the assembly 51 are all vulcanized together. This time the reaction is carried to completion.

All that is then needed to complete the plug 10 is to bolt to it the metal cap 13, already described.

In use, the device comprises substantially a single assembly 51 of all the rubber portions plus the head 12, with the cap 13 being attached at a desired time. Then the cable or chain 19 is secured to the anchor member 17, and an air pressure conduit 22 is attached to the air inlet fitting 16. The plug 10 is then located at a desired location in the pipe 20, usually with the aid of the cable or chain 19, and air pressure is applied to expand the plug 10. The expansion takes place beyond the sleeve 60 and beyond the band 40. Thereby, there is not a great deal of flexing at the juncture between the head 12 and the rubber assembly 51, nor even at the band 40. The reinforcements provided give great strength during this and make possible tremendous elongations.

When the desired object has been accomplished the plug 10 is deflated and can then be moved to new location or removed from the pipe 20 by means of the cable or chain 19.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A molded inflatable pipe plug, including in combination:
   (a) an assembly comprising, vulcanized together,
      (1) an inner one-piece rubber member in the shape of a cylinder open at one end and closed by a dome at the other,
      (2) a first strip of rubber wire cord having unidirectional threads, covering said dome,
      (3) a second strip of rubber tire cord covering said first strip, and having unidirectional threads running at about 45° with respect to the threads of said first strip,
      (4) a first sleeve of rubber tire cord having unidirectional threads, covering said cylinder and the strip-covered dome, said first sleeve having a first terminal portion capable of extending beyond said open end and a second terminal portion capable of extending beyond the juncture of said cylinder and dome, said threads lying at about 10° to an axially extending longitudinal line, said second terminal portion being split into several strip-like portions adhered to said dome and said first and second strips, with overlap,
      (5) a circumferential band of rubber tire cord with unidirectional threads running circumferentially, overlying said first sleeve adjacent to said open end,
      (6) a second sleeve of rubber tire cord with unidirectional threads, spaced from said open end and covering a portion of said band and a portion of said first sleeve, with its threads lying at about 10° to said longitudinal line in the opposite direction from those of said first sleeve, thereby forming an angle of about 20° with them, said second sleeve having one end substantially co-terminous with that of said second terminal portion and split into several strip-like portions, covering said dome, said first and second strips and the strips of said first sleeve, with overlap,
      said first terminal portion of said first sleeve being folded back to overlie the full width of said band and a portion of said second sleeve therebeyond, and
      (7) an outer rubber member shaped generally like said inner rubber member and covering all said strips,
   (b) an aluminum head having an axially extending tubular portion fitting into the interior of said assembly and against the inner cylindrical surface thereof for a distance somewhat shorter than the width of said band and having an end flange extending radially outwardly, engaging said open end of said assembly and provided with a series of axially extending bolt openings.
   (c) a molded rubber sleeve longer than said tubular portion firmly secured to the inner wall of said tubular portion and to the inner cylindrical surface of said assembly therebeyond, said head, molded sleeve, and assembly being vulcanized together, (d) an annular gasket over said flange at the exposed face thereof, and (e) a metal cap bolted to said flange of said head, said cap having a central exterior anchor means for securing a cable or chain thereto and inlet fitting means for sending air under pressure into the interior of said plug.

2. The plug of claim 1 wherein said gasket is vulcanized to said head.

3. The plug of claim 1 wherein the edge of said sleeve that is secured to said assembly is beveled.

4. The plug of claim 1 wherein said band is spaced apart from said open end, as is the folded-over portion of said first sleeve, so that the reinforcing sleeves, strips, and bands are completely encased with said rubber members.

5. A rubber member for use in a molded inflatable pipe plug, including in combination:
    (1) an inner one-piece generally cylindrical rubber member,
    (2) a first sleeve of rubber tire cord having unidirectional threads, encircling said cylindrical member and having a first terminal portion capable of extending beyond one end of said cylindrical member, said first sleeve having unidirectional threads lying at about 10° to an axially extending longitudinal line,
    (3) a circumferential band of rubber tire cord with unidirectional threads running circumferentially, overlying said first sleeve adjacent to said end, and
    (4) a second sleeve of rubber tire cord with unidirectional threads, covering at least a portion of said band and at least a portion of said first sleeve, and with its threads lying at about 10° to said longitudinal line in the opposite direction from those of said first sleeve, thereby forming an angle of about 20° with them,
    said first terminal portion of said first sleeve being folded back to overlie said band and a portion of said second sleeve, and
    (5) an outer generally cylindrical rubber member covering all said strips,
    all said elements (1) to (5) being at least partially vulcanized together into a unitary whole.

6. A rubber member for use in a molded inflatable pipe plug, including in combination:
    an assembly comprising, at least partially vulcanized together,
    (1) an inner one-piece rubber member in the shape of a cylinder open at one end and closed by a dome at the other,
    (2) a first strip of rubber tire cord having unidirectional threads, covering said dome,
    (3) a second strip of rubber tire cord covering said first strip, and having unidirectional threads running at about 45° with respect to the threads of said first strip,
    (4) a first sleeve of rubber tire cord having unidirectional threads, covering said cylinder and the strip-covered dome, said first sleeve having a first terminal portion capable of extending beyond said open end and a second terminal portion capable of extending beyond the juncture of said cylinder and dome, said threads lying at about 10° to an axially extending longitudinal line, said second terminal portion being split into several strip-like portions adhered to said dome and said first and second strips, with overlap,
    (5) a circumferential band of rubber tire cord with unidirectional threads running circumferentially, overlying said first sleeve adjacent to said open end,
    (6) a second sleeve of rubber tire cord with unidirectional threads, spaced from said open end and covering a portion of said band and a portion of said first sleeve, and with its threads lying at about 10° to said longitudinal line in the opposite direction from those of said first sleeve, thereby forming an angle of about 20° with them, said second sleeve having one end substantially co-terminous with that of said second terminal portion and split into several strip-like portions, covering said dome, said first and second strips and the strips of said first sleeve, with overlap,
    said first terminal portion of said first sleeve being folded back to overlie the full width of said band and a portion of said second sleeve therebeyond, and
    (7) An outer rubber member shaped generally like said inner rubber member, covering all said strips, sleeves, and bands.

7. A method for making a molded inflatable pipe plug, comprising the following steps:
    molding an inner one-piece rubber member in the shape of a cylinder open at one end and closed by a dome at the other, the dome and cylinder being integral with each other,
    covering said dome snugly with a first strip of sticky rubber tire cord having unidirectional threads,
    covering said first strip snugly with a second strip of sticky rubber tire cord also having unidirectional threads running at about 45° with respect to the threads of said first strip,
    covering said cylinder snugly with a first sleeve of sticky rubber tire cord having unidirectional threads, said first sleeve having a first terminal portion extending well beyond said open end and a second terminal portion extending beyond the juncture of said cylinder and dome, said threads lying at about 10° to an axially extending longitudinal line,
    splitting said second terminal portion into several strip-like portions and covering said dome and said first and second strips snugly therewith, with overlap of the strip-like portions with each other,
    applying to said cylinder snugly over said first sleeve adjacent to said open end a circumferential band of sticky rubber tire cord with unidirectional threads running circumferentially,
    covering a portion of said band and a portion of said first sleeve snugly with a second sleeve made from sticky rubber tire cord with unidirectional threads lying at about 10° to said longitudinal line in the opposite direction from those of said first sleeve, thereby forming an angle of about 20° with them, said second sleeve being applied with one edge overlapping said band and the other end substantially co-terminous with that of said second terminal portion,
    splitting a portion of said second sleeve near said other end into several strip-like portions and covering said dome and said first and second strips and said first sleeve snugly therewith, with overlap of the strip-like portions with each other, folding back said first terminal portion of said first sleeve and bringing it snugly over all of said band and over a portion of said second sleeve, covering all said strips snugly with an outer rubber member, and partially vulcanizing all said strips, sleeves, band, and said inner and outer members together into an assembly, lightly coating with rubber cement an aluminum head having an axially extending tubular portion for fitting into the interior of said assembly for a distance somewhat shorter than the width of said band, said head having an end flange extending radially outwardly from said tubular portion and provided with a series of axially extending bolt openings, inserting said head into said assembly with said tubular portion engaging the inner cylindrical surface of said assembly and with said flange engaging said open end, inserting into said tubular portion a molded rubber sleeve longer than said tubular portion and pressing it firmly against the inner wall of said tubular portion and against said assembly therebeyond, vulcanizing said head, molded sleeve, and assembly together into a plug, and bolting and gasketing to said flange of said head a metal cap having a central exterior anchor means for securing a cable or chain thereto and fitting means for the application of air under pressure to the interior of said plug.

8. The method of claim 7 wherein said band is set back from said open end, as is the fold line of said first sleeve, said step of covering with said outer rubber member encasing all said reinforcing strips, sleeve, and band fully within said inner and outer rubber members.

9. In a method for making a molded inflatable pipe plug, the following steps:

molding an inner one-piece rubber member in the shape of a cylinder open at one end and closed by a dome at the other, the dome and cylinder being integral with each other, covering said dome snugly with a first strip of sticky rubber tire cord having unidirectional threads, covering said first strip snugly with a second strip of sticky rubber tire cord also having unidirectional threads running at about 45° with respect to the threads of said first strip, covering said cylinder snugly with a first sleeve of sticky rubber tire cord having unidirectional threads, said first sleeve having a first terminal portion extending well beyond said open end and a second terminal portion extending beyond the juncture of said cylinder and dome, said threads lying at about 10° to an axially extending longitudinal line, splitting said second terminal portion into several strip-like portions and covering said dome and said first and second strips snugly therewith, with overlap of the strip-like portions with each other, applying to said cylinder snugly over said first sleeve and immediately adjacent to said open end a circumferential band of sticky rubber tire cord with unidirectional threads running circumferentially, covering a portion of said band and a portion of said first sleeve snugly with a second sleeve made from sticky rubber tire cord with unidirectional threads lying at about 10° to said longitudinal line in the opposite direction from those of said first sleeve, thereby forming an angle of about 20° with them, said second sleeve being applied with one edge overlapping said band and the other end substantially co-terminous with that of said second terminal portion, splitting a portion of said second sleeve near said other end into several strip-like portions and covering said dome and said first and second strips and said first sleeve snugly therewith, with overlap of the strip-like portions with each other, folding back said first terminal portion of said first sleeve and bringing it snugly over all of said band and over a portion of said second sleeve, covering all said strips snugly with an outer layer of rubber, and vulcanizing all said strips, said band, and said inner and outer layers together into an assembly.

10. The method of claim 9 wherein said band is set back from said open end, as is the fold line of said first sleeve, said step of covering with said outer rubber member and vulcanizing, encasing all said reinforcing strips, sleeves, and band fully within said inner and outer rubber members.

11. In a method for making a molded inflatable pipe plug, the following steps:

molding an inner one-piece generally cylindrical rubber member, covering said cylinder snugly with a first sleeve of sticky rubber tire cord having unidirectional threads, said first sleeve being applied to provide a sleeve having a terminal portion extending well beyond one end of said rubber member, said threads lying at about 10° to an axially extending longitudinal line, applying to said cylinder snugly over said first sleeve and adjacent to said one end a circumferential band of sticky rubber tire cord with unidirectional threads running circumferentially, covering a portion of said band and a portion of said first sleeve snugly with a second sleeve made from sticky rubber tire cord with unidirectional threads lying at about 10° to said longitudinal line in the opposite direction from those of said third strip, thereby forming an angle of about 20° with them, said second sleeve overlapping a portion only of said band, folding back said terminal portion of said first sleeve and bringing it snugly over all of said band and over a portion of said second sleeve, covering all said sleeves, band, and strips snugly with an outer layer of rubber, and vulcanizing all said strips, said band, and said inner and outer layers together into an assembly.

* * * * *

UNITED STATES PATENT AND TRADEMARK OFFICE
CERTIFICATE OF CORRECTION

PATENT NO. : 4,079,755
DATED : March 21, 1978
INVENTOR(S) : Gerald J. Van der Lans It is certified that error appears in the above-identified patent and that said Letters Patent are hereby corrected as shown below:

Column 1, line 13, "cable of" should read --cable or--.

Column 2, line 63, "are band" should read --and band--.

Column 6, line 17, "wire cord" should read --tire cord--.

Signed and Sealed this

Twenty-fourth Day of October 1978

[SEAL]

Attest:

RUTH C. MASON
Attesting Officer

DONALD W. BANNER
Commissioner of Patents and Trademarks